Patented Dec. 13, 1927.

1,652,259

UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS COMPOSITION.

No Drawing. Original application filed May 28, 1921, Serial No. 473,374, and in Canada December 29, 1921. Divided and this application filed April 8, 1922. Serial No. 550,786.

This application, which is filed as a division of my prior application, Serial No. 473,374, filed March 28, 1921, has for its purpose to protect the discovery made by me that the addition of sulphates to a glass of relatively high silica content containing boric acid causes the glass, which would otherwise be transparent, to become translucent or semi-opaque, and this, without the use of fluorides, phosphates, or alumina heretofore used for that purpose, although the desired result is not interfered with by the presence of alumina or other elements such as lime, magnesia, zinc, lead, etc. The glass resulting from this invention is superior in may respects to the old fluoride or phosphate opals. The color does not strike as do the ordinary fluoride and phosphate opals, and the glass can be repeatedly heated without appreciable change in color. The crystals are much larger and the filaments of the electric lamp are thereby not changed in hue, and the glass is thus desirable for use in the manufacture of lighting fixtures, as well as for other translucent ware for table or oven use.

In carrying out my invention, I add to a proper boro-silicate foundation glass or to a suitable batch therefor, a relatively small quantity of the selected sulphate, preferably, but not necessarily, the sulphate of an alkali metal such as sodium, potassium, or lithium. I find that for every one-hundred parts of foundation glass or of a batch therefor, one to five percent of the desired salt may be used to the best advantage. Under certain conditions, larger or even smaller amounts may be used.

Generally speaking, the foundation glass to which the sulphate is added should contain over 70% of silica, and over 3% of boric oxide and a proper alkali (soda, potash oxide and/or lithia) content, with or without other ingredients.

The following are examples of foundation glasses which I have successfully used:

|         | I    | II | III | IV | V  | VI | VII | VIII | IX   | X  | XI | XII |
|---------|------|----|-----|----|----|----|-----|------|------|----|----|-----|
| $SiO_2$ | 71½  | 75 | 75  | 75 | 78 | 80 | 80  | 80   | 76   | 85 | 85 | 90  |
| $B_2O_3$| 22½  | 13 | 17  | 22 | 16 | 10 | 18  | 13½  | 12   | 10 | 7  | 3   |
| $Na_2O$ | 6    | 12 | 8   | 3  | 6  | 10 | 2   | 4½   | 8    | 5  | 8  |     |
| $Al_2O_3$|     |    |     |    |    |    | 2   |      |      |    |    | 2   |
| $Li_2O$ |      |    |     |    |    |    |     | 4    |      |    |    | 5   |
| $CaO$   |      |    |     |    |    |    |     |      |      |    |    |     |

Generally speaking, the alkali to boric oxide ratio is of importance, as glass containing more alkali than boric oxide does not give as good results as a glass having a higher relative percentage of boric oxide. In the above compositions $K_2O$ may be used to replace $Na_2O$ in whole, or in part, without affecting the invention. $Li_2O$ may be used in some cases, but if used exclusively or in excessive amount, often destroys the desired type of opacity. Other elements such as lime, magnesia, zinc, lead, etc.; as well as coloring oxides, may be introduced into these compositions in limited amounts, with beneficial effects on certain physical properties, such as stability and color, without seriously affecting the opacity. The opacity is, however, sensitive to changes in composition and may be destroyed by the use of too large quantities of elements other than silica and boric oxide. The amount of opacity is not dependent entirely on the amount of salts retained in the glass, as different base compositions tend to retain different amounts of salts, but the melting conditions and the batch must be such as to not entirely reduce the sulphate and result in the volatilization of the sulphur.

In the annexed claims I use the term "clouded glass" as meaning a glass which is either translucent or opaque, but do not imply any localized as distinguished from general opacity or translucency.

I am aware that prior to my invention it has been proposed to produce translucent or opaque glasses by adding to a glass batch a sulphate salt, a fluoride and alumina, and that it is stated that such last named ingredients when added to any glass batch will produce translucency. My invention however differs therefrom in that the presence of alumina is not essential to obtain the translucency or opacity and in that it is not applicable to all glass compositions, but is restricted as before stated, to those of a certain definite character.

What I claim as new and desire to secure by Letters Patent is,—

1. The process of making a clouded glass comprising adding to a batch free from substantial quantities of lead and containing at least 3% boric oxide, a relatively high percentage of silica and only a relatively small percentage of alumina, an opacifying agent in the form of a sulphate salt and melting the mixture under conditions which do not result in a volatilization of the sulphur content.

2. The process of making a clouded glass comprising adding to a batch free from substantial quantities of lead and containing boric oxide, over 70% silica and only a relatively small amount of alumina, an opacifying agent in the form of a sulphate salt and melting the mixture under conditions which do not result in a volatilization of the sulphur content.

3. The process of making a clouded glass comprising adding to a batch free from substantial quantities of lead and containing boric oxide, alkali, silica, and only a relatively small amount of alumina, the boric oxide and silica content being relatively high, an opacifying agent in the form of a sulphate salt and melting the mixture under conditions which do not result in a volatilization of the sulphur content.

4. A cloudy glass containing boric oxide, over 70% silica, only a relatively small percentage of alumina and an opalescing agent in the form of a sulphate salt.

In testimony whereof I hereunto affix my signature.

WILLIAM CHITTENDEN TAYLOR.